United States Patent Office 3,529,171
Patented Sept. 15, 1970

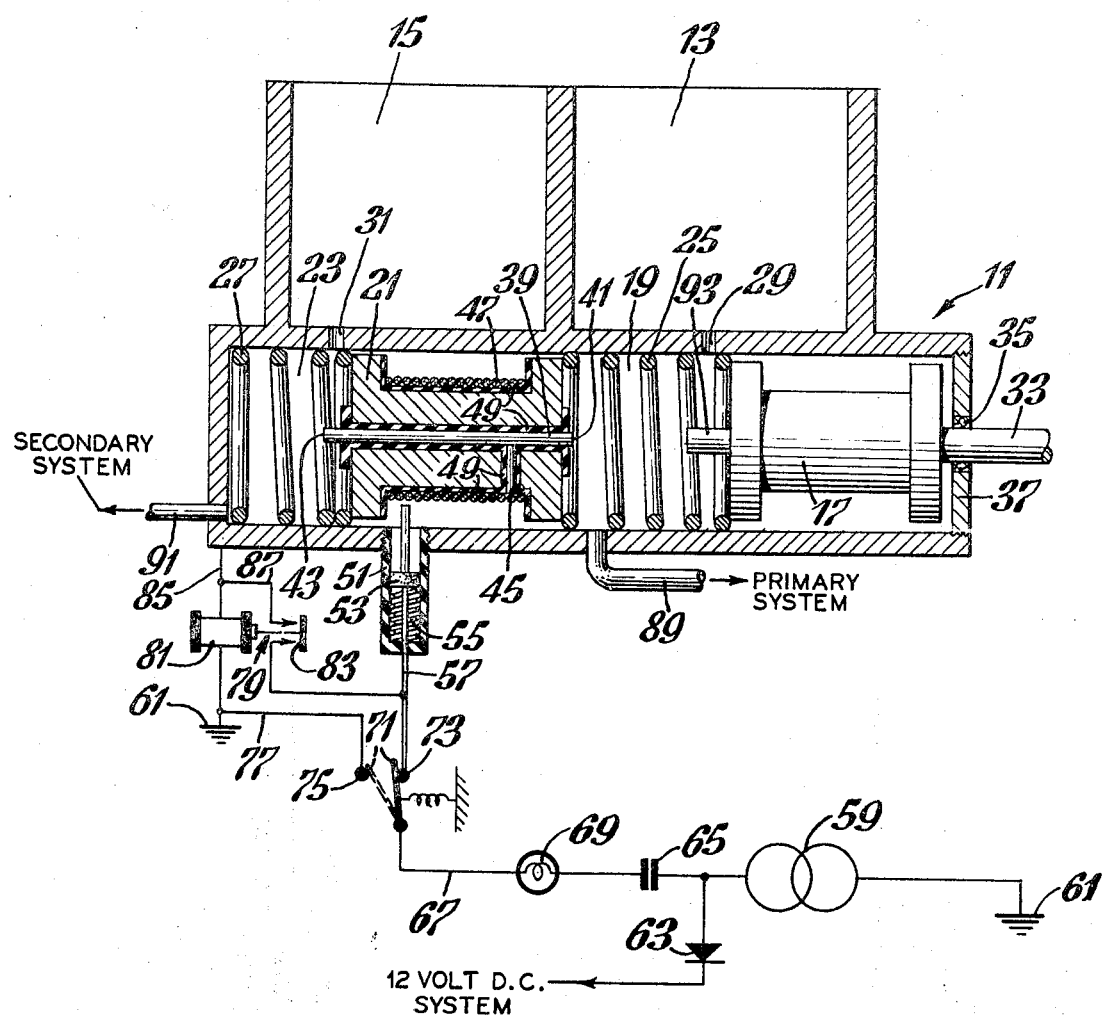

3,529,171
VEHICLE BRAKE FAILURE WARNING SYSTEM
David H. Hultgren, South Salem, and Robert A. Jackson, Mamaroneck, N.Y., assignors to Union Carbide Corporation, New York, N.Y., a corporation of New York
Filed Jan. 9, 1969, Ser. No. 790,094
Int. Cl. B60q 1/26
U.S. Cl. 307—10                                         6 Claims

ABSTRACT OF THE DISCLOSURE

An electrical signal warning system for incorporation in a vehicular brake hydraulic master cylinder apparatus which provides a malfunction signal such as an indicator lamp energization when the hydraulic fluid level is abnormally low or fluid pressure lost during brake activation due to a line rupture or other system malfunction by permitting electrical circuit closure through a first contact on a reciprocally moving hydraulic piston and a second relatively fixed contact in the apparatus thus connecting the indicator means to an electrical energy source such as the vehicle alternator.

---

The present invention relates to a hydraulic master cylinder fluid loss warning system and more particularly to a switching structure and related circuit associated directly with the master cylinder apparatus rather than being separate therefrom.

Federal standards requiring dual hydraulic brake systems on automotive vehicles established around the middle of 1966, require that the effectiveness of a dual hydraulic system shall be indicated by means of an electrically operated lamp mounted on the vehicle instrument panel. Automotive manufacturers and brake specialty manufacturers have met this requirement by providing one or another form of a pressure differential valve and switch through which the tandem lines from the dual master cylinder pass. The loss of pressure in either the primary (front wheel brakes) or the secondary (rear wheel brakes) portions of the dual system causes the movement of a differential type piston element in the pressure differential valve to one side or the other, depending upon which line suffers the pressure loss, and this movement causes an electrical circuit closure through means of a drop-in or the like contact element connecting a warning indicator lamp to the vehicle's electrical energy source. The structure of the conventionally used pressure differential valve and switch device is such that electrical contacts therein are not exposed to the hydraulic fluid in the system.

The inclusion of this additional pressure differential valve and switch element in the dual hydraulic system solely for the purpose of providing the required warning lamp indication is not a completely desirable solution to meeting the requirement of the Federal standards. Numerous attempts have been made to incorporate warning indicator lamp switching elements in the master cylinder body itself in order to effect simplicity and structural consolidation of the braking system equipment. None of the efforts at incorporating the lamp switching elements in the master cylinder has been completely successful, mainly because with the warning indicator lamp circuit switching elements exposed to the hydraulic fluid in the master cylinder assembly the resulting electrolytic action due to D.C. potential causes brake fluid degradation and within a short time severe metal corrosion on the switch contacts and master cylinder parts. Since the majority of automotive vehicles manufactured since the establishment of the Federal standards include an A.C. alternator rather than a D.C. generator, the concept of utilizing an A.C. circuit instead of a D.C. circuit was conceived as the inception of the present invention. A.C. potential because of its reversing polarity, will not introduce an electrolytic action on the brake fluid or metal components of the brake system.

With this then being the state of the art, the present invention was conceived and developed to provide switching and circuit apparatus involving only a master cylinder assembly, that is to say, without the need for any external differential valving mechanism-switch or the like.

It is therefore an object of the present invention to provide, as an improvement on a vehicular hydraulic master cylinder, a brake failure warning light switching apparatus.

It is a further object of the present invention to provide such brake fluid failure warning light switching apparatus in a dual hydraulic master cylinder system.

A still further object of the invention is to provide a simplified brake fluid failure warning light switching system incorporated in a master cylinder structure which is particularly suitable for use with an A.C. electrical energy source rather than a D.C. energy source.

Additional objects and features of the invention will become more readily apparent from the ensuing description read with reference to the single drawing figure which is a longitudinal cross-section of a dual hydraulic vehicular master cylinder including the component parts of the invention and showing schematically the electrical circuitry of the invention exterior of the master cylinder.

A vehicular brake hydraulic system according to the invention is illustrated in the drawing wherein there is shown a master cylinder body indicated generally at 11, having a primary system reservoir 13 and a secondary system reservoir 15. The interior or actual cylinder portion of the body 11 contains a primary piston 17 which moves reciprocally in a primary system actuating chamber 19 and a secondary piston 21 which moves reciprocally in a secondary system actuating chamber 23, the actuating chambers 19 and 23 are actually contiguous portions of the cylinder body 11 and are defined by the respective pistons 17 and 21 and the left end wall of the cylinder body 11. A primary piston return spring 25 is provided between primary piston 17 and secondary piston 21 to urge primary piston 17 to the right in the drawing to its non-actuated position when no external force is applied and a similar piston return spring 27 is arranged between the secondary piston and the left end wall of the master cylinder body 11 to urge secondary piston 21 to the right of its non-actuated position when no external force is applied to the system. A port 29 connects the primary system reservoir 13 with primary system actuating chamber 19 and a port 31 connects the secondary system reservoir 15 with secondary system actuating chamber 23. Ports 29, 31 permit the free flow of hydraulic fluid back and forth between the reservoirs and their respective actuating chambers during operation of the systems.

A primary system fluid conduit 89 extends from the primary system actuating chamber 19 to primary system devices, for example front wheel brake cylinders, and a secondary system fluid conduit 91 extends from the secondary system actuating chamber 23 to secondary system devices, for example, rear wheel brake cylinders. An actuating rod 33 connects the primary piston 17 to mechanical braking linkage (not shown) external of the system as illustrated in the drawing. The actuating rod 33 extends to the right in the drawing exteriorly of the cylinder body 11 through a packing gland 35 in an end closure cap 37 fitted sealably to the right end of the cylinder body 11.

The secondary piston 21 is fitted with a longitudinally extending steel rod or other electrically conductive member 39 located for instance in a hole drilled axially through the piston for the purpose. The rod 39 provides at its respective ends electrical contacts 41 and 43, the purpose of which will be described more fully hereinafter. A radially extending conductive rod 45 or the like connects to rod 39 at its inner end and a wrapping of wire 47 arranged on the recessed portion of the piston 21. The rods 39 and 45 and the wire 47 are all electrically insulated from the piston by insulation 49 which may be for example an epoxy cement which also serves to hold the electrically conductive parts in place in an on the piston 21.

An electrical brush housing 51 is arranged in the cylindrical wall of the body 11 and holds a brush 53 which is urged into wiping contact with the wire 47 wrapping on piston 21 by a brush spring 55. A brush pigtail 52 extends exteriorly of brush housing 51 and serves to connect the brush 53 electrically with the system wiring circuit. The brush housing 51 may be made of insulative material as shown in the drawing or may be insulatively lined to prevent electrical contact with the cylindrical body 11. Alternative structures are also possible for the other specifically described elements. For instance the wire 47 wrapping on the piston 21 may be alternatively a thin metallic sheet to provide wiping contact with brush 53 and the electrical contacts 41, 43 may be attached to insulated areas on the piston 21 ends and connected electrically by a circuit wire or conductive strap instead of being defined as ends of the conductive rod 39, it being only necessary as can be seen from the foregoing description and the drawing that an electrical circuit is provided through some sort of wiping contact between electrical contact points located at the respective ends of the secondary piston 21 and the brush pigtail 57 and that this circuit be insulated generally as illustrated from the electrically conductive portions of the apparatus.

In the associated electrical circuit shown in the drawing there is provided as an electrical energy source an automotive type alternator 59 with one output terminal connected to a chassis ground 61 and its other output terminal connected to the vehicle D.C. system through rectifier means 63 and through conductor 67 to the warning circuit illustrative of the present invention through a capacitor 65 which blocks small D.C. currents superimposed on the alternator A.C. output (caused for example by D.C. back-leakage through the rectifier means 63) from the warning circuitry. Conductor 67 series connects from capacitor 65 through an indicator device such as lamp 69 and a spring-maintained contact 73 of a momentary contact single pole double throw indicator test switch 71 to the brush pigtail 57. The test switch 71 can be thrown from its spring-maintained contact 73 to its contact 75 to complete a circuit through conductor 77 to ground 61 in order to test the operability of the warning circuit indicator device such as lamp 69 and is spring-returned to its normal contact 73 when released. A hold-in relay 79 is provided having an actuating coil 81 series connected in a conductor 85 extending from the cylinder body 11 to ground 61 and a contactor 83 (open when coil 81 is not energized) series connected in a conductor 87 which extends between relay coil conductor 85 and conductor 67.

In normal operation, hydraulic fluid fills both reservoirs 13 and 15, their respective related actuating chambers 19 and 23 through the ports 29 and 31, the primary system and secondary system conduits 89, 91 and respective related hydraulically actuated devices. When at rest, i.e. when there is no external force applied to the system, the pistons 17 and 21 repose generally in the positions shown in drawing. When an actuating force such as from a brake foot pedal and related mechanical linkage is applied to the actuating rod 33, primary piston 17 is urged towards the left in the drawing so as to compress the hydraulic fluid in the primary system actuating chamber 19. The fluid pressure thus induced in primary system actuating chamber 19 in turn urges the secondary piston 21 towards the left. These pressures induced in the primary and secondary actuating chambers apply to the hydraulically actuated primary and secondary system devices, for example, the front and rear brake actuating cylinders, through the respective fluid conduits 89, 91. When the applied actuating force is removed, the return springs 25, 27 which were compressed during application of the actuating force, return the primary and secondary pistons 17, 21 to their respective normal positions as shown in the drawing. If the normal fluid content is maintained in the system, that is to say there is no leakage or other loss of fluid in either the primary or secondary systems, there will always be sufficient fluid in the primary system actuating chamber to prevent electrical closure between contact 41 and a mating contact 93 on the left end of primary piston 17 and, similarly, sufficient fluid in the secondary system actuating chamber to prevent electrical closure between contact 43 and the left end wall of cylinder body 11.

Should there occur leakage or other loss of hydraulic fluid only in the primary system, a force applied to actuating rod 33 will drive the primary piston 17 all the way to the left without restraint other than the reaction of the return spring 25 and an electrical closure will be made between the contacts 41 and 93. This closure completes an electrical circuit from the alternator (which has one output terminal grounded at 61) through conductor 67, capacitor 65, indicator lamp 69, switch 71, brush pigtail 57, brush 53, wiping contact wire 47, radial conductive rod 45, axial conductive rod 39, contact 41, contact 93, the electrically conductive portions of piston 17, spring 25 and cylinder body 11 to conductor 85, through hold-in relay 79 actuating coil 81 to ground 61. Indicator lamp 69 lights on the dashboard for instance, thus signalling the malfunction to the vehicle operator, and is maintained lit by the closure of hold-in relay 79, contact 83 of which closes and stays closed as long as the hold-in relay 79 coil 81 remains energized. When the actuating force is removed from rod 33 so that spring 25 returns piston 17 to its normal position and thus breaks the contact 41-93 closure, the indicator lamp circuit will be maintained through capacitor 65, indicator lamp 69, switch 71, conductor 67, conductor 87, hold-in relay 79 contact 83, hold in relay 79, coil 81 and conductor 85 to ground 61.

Should there occur leakage of other loss of hydraulic fluid only in the secondary system, a force applied to actuating rod 33 will urge the primary piston 17 towards the left, compressing the fluid in actuating chamber 19 which in turn will drive the secondary piston 21 all the way to the left without restraint other than the reaction of return spring 27 and an electrical closure will be made between the contact 43 and the left end wall of the cylinder body 11. This closure will effect completion of the electrical circuit as described hereinabove except for the contact 43 instead of the contact 41 involvement and which will be maintained in the same manner by virtue of hold-in relay 79.

Leakage or loss of fluid simultaneously in both systems will cause one or the other or both of the above described electrical closures to be made upon the application of an actuating force and the warning circuit will thus be completed and maintained as hereinabove described.

It will be apparent from inspection of the electrical circuit shown in the drawing that the indicator light 69 will remain energized and lit after the application and removal of any actuating force which causes electrical circuit closure through the contacts and/or master cylinder body of the apparatus as described above until either the electrical output of the alternator ceases, for example, by shutting off the vehicle's engine, or until the test switch 71 is momentarily depressed, breaking the circuit to the hold-in relay 79 coil 81 through hold-in relay contact 83. An alternative connection is possible involving the connection of the hold-in relay contact conductor 87 to the conductor 67 at a point between indicator light 69 and test switch 71 rather than as in the drawing which shows hold-in relay contact conductor 87 connected to conductor 67 at a point between test switch 71 and brush pigtail 57.

It is also possible and within the skill of the persons familiar with the electrical arts to incorporate the test switch 71 or its functional equivalent in the main ignition switch of the vehicle.

Numerous other electrical circuit alternatives within the scope of the invention will occur to persons familiar with the art in the light of this present disclosure. For example, a flasher element may be incorporated in the circuitry which will cause the indicator light 69 to flash continually upon occurrence of a malfunction.

The apparatus which has been described hereinabove, while being particularly suitable for use with an A.C. electrical energy source is not necessarily limited thereto, nor is the invention limited to utilization only on dual hydraulic master cylinder assemblies, it being equally adaptable to single hydraulic systems. The description hereinabove given therefor is to be taken as illustrative only and not to be construed in any limiting sense, it being intended to define the present invention according to the appended claims.

What is claimed is:

1. In a hydraulic master cylinder assembly which includes
    a hydraulic fluid reservoir
    a body portion including an actuating chamber communicating with the hydraulic fluid reservoir; and
    a piston arranged to move reciprocally in the actuating chamber between a first position in which no actuating force is applied thereto and a second position in which actuating force is applied thereto;
    resilient means arranged and disposed to urge the piston into its first position when no actuating force is applied thereto and actuating means operably connected to and adapted to move the primary piston from its first position towards and to its second position upon the application thereto of an actuating force;
    the improvement comprising
    an electrical contact on the piston arranged to close an electrical circuit when the piston is in its second position;
    electrical wiping contact means arranged longitudinally on the secondary piston;
    electrical connection means between the electrical contact and the wiping contact means;
    electrical brush means in said body portion arranged and disposed to make continuous electrical contact with the electrical wiping contact means at all positions of the piston;
    insulation means to insulate the wiping contact means, the connection means, and the electrical brush means from the electrically conductive portions of the assembly, and;
    circuit means communicating between the brush means, an indicator means, an electromotive source and the point where electrical circuit closure is effected by the electrical contact.

2. Apparatus according to claim 1 wherein the last recited circuit means comprises, at least in part, electrically conductive portions of the hydraulic master cylinder assembly.

3. Apparatus according to claim 1 wherein the last recited circuit means includes hold-in electrical relay means arranged and disposed to maintain an electrical circuit between the indicator means and the electromotive source after the application and removal of an actuating force to the piston.

4. In a vehicular brake dual hydraulic master cylinder assembly which includes
    a primary system reservoir;
    a secondary system reservoir;
    a body portion including a primary system actuating chamber communicating with the primary system reservoir, and
    a secondary system actuating chamber communicating with the secondary system reservoir;
    a primary piston arranged to move reciprocally in the primary system actuating chamber between a first position in which no actuating force is applied thereto and a second position in which actuating force is applied thereto;
    a secondary piston arranged to move reciprocally in the secondary system actuating chamber between a first position in which no actuating force is applied thereto and a second position in which actuating force is applied thereto;
    first resilient means between the primary piston and the secondary piston arranged and disposed to urge the primary piston into its first position;
    second resilient means between the secondary piston and an end wall of the body portion arranged and disposed to urge the secondary piston into its first position and
    actuating means operably connected to and adapted to move the primary piston from its first position towards and to its second position upon the application thereto of an actuating force;
    the improvement comprising, in combination,
    a first electrical contact on the secondary piston arranged to close an electrical circuit when the primary piston is in its second position and the secondary piston is in its first position;
    a second electrical contact on the secondary piston arranged to close said electrical circuit when the secondary piston is in its second position;
    electrical wiping contact means arranged longitudinally on the secondary piston;
    electrical connection means between the first and second contacts and the wiping contact means;
    electrical brush means in said body portion arranged and disposed to make continuous electrical contact with the electrical wiping contact means at all positions of the secondary piston;
    insulation means to insulate the wiping contact means, the connection means, and the electrical brush means from the electrically conductive portions of the assembly; and
    circuit means communicating between the brush means, and indicator means, an electromotive source and each of the points where electrical circuit closure is effected by the first and second electrical contacts.

5. Apparatus acording to claim 4 wherein the last recited circuit means comprises, at least in part, electrically conductive portions of the hydraulic master cylinder assembly.

6. Apparatus according to claim 4 wherein the last recited circuit means includes hold-in relay means arranged and disposed to maintain an electrical circuit between the indicator means and the electromotive source after the application and removal of an actuating force to the piston.

References Cited

UNITED STATES PATENTS

| 2,535,940 | 12/1950 | Malvin. |
| 2,965,730 | 12/1960 | Regoli et al. |
| 3,411,133 | 11/1968 | Gardner _____ 340—52 X |
| 3,421,322 | 1/1969 | Reznicek. |

ROBERT K. SCHAEFER, Primary Examiner

T. B. JOIKE, Assistant Examiner

U.S. Cl. X.R.

200—82; 340—52